(12) United States Patent
Numano et al.

(10) Patent No.: US 7,823,090 B2
(45) Date of Patent: Oct. 26, 2010

(54) INFORMATION-PROCESSING APPARATUS AND CLOCK INFORMATION DISPLAY CONTROL METHOD FOR USE IN THE APPARATUS

(75) Inventors: Fujihito Numano, Hamura (JP); Yuuki Saikawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 110 days.

(21) Appl. No.: 12/216,877

(22) Filed: Jul. 11, 2008

(65) Prior Publication Data

US 2009/0031233 A1  Jan. 29, 2009

Related U.S. Application Data

(63) Continuation of application No. 10/183,507, filed on Jun. 28, 2002, now Pat. No. 7,406,667.

(30) Foreign Application Priority Data

Sep. 21, 2001   (JP)   ............................. 2001-290247

(51) Int. Cl.
*G06F 3/14* (2006.01)
*G06F 3/147* (2006.01)

(52) U.S. Cl. .................... 715/864; 715/700; 715/804; 345/156

(58) Field of Classification Search ............... 715/700, 715/784, 786
See application file for complete search history.

(56) References Cited

U.S. PATENT DOCUMENTS

| | | | |
|---|---|---|---|
| 4,561,845 A | 12/1985 | Meller | |
| 5,068,838 A | 11/1991 | Klausner et al. | |
| 5,258,964 A * | 11/1993 | Koma et al. | 368/47 |
| 5,487,054 A | 1/1996 | Capps et al. | |
| 5,526,515 A | 6/1996 | Ross et al. | |
| 5,528,558 A * | 6/1996 | Mardhekar et al. | 368/10 |
| 5,613,135 A | 3/1997 | Sakai et al. | |
| 5,619,477 A | 4/1997 | Schenk | |
| 5,710,911 A | 1/1998 | Walsh et al. | |
| 5,768,164 A | 6/1998 | Hollon, Jr. | |
| 5,826,066 A | 10/1998 | Jardine et al. | |
| 5,845,257 A * | 12/1998 | Fu et al. | 705/8 |

(Continued)

FOREIGN PATENT DOCUMENTS

EP    1 139 203 A2    10/2001

(Continued)

OTHER PUBLICATIONS

Paul McFedries et al, "Windowsa 98 unleashed", 1998 Sams Publishing, pp. 1-6.

(Continued)

*Primary Examiner*—Steven B Theriault
(74) *Attorney, Agent, or Firm*—Finnegan, Henderson, Farabow, Garrett & Dunner, L.L.P.

(57) ABSTRACT

An apparatus controls a main display and a sub-display. The apparatus includes a section which displays, on the sub-display, clock information indicating of time, a section which acquires changed time information, when the time information has been changed, and a section which changes a present value of the time of the clock information displayed on the sub-display, based on the acquired changed time information.

6 Claims, 5 Drawing Sheets

U.S. PATENT DOCUMENTS

| | | | |
|---|---|---|---|
| 5,920,824 A * | 7/1999 | Beatty et al. | 455/425 |
| 5,943,297 A | 8/1999 | Baker | |
| 5,974,569 A * | 10/1999 | Nickles | 714/38 |
| 6,038,670 A | 3/2000 | Oh | |
| 6,067,627 A | 5/2000 | Reents | |
| 6,069,848 A | 5/2000 | McDonald et al. | |
| 6,101,591 A | 8/2000 | Foster et al. | |
| 6,192,007 B1 * | 2/2001 | Aoshima | 368/10 |
| 6,192,480 B1 | 2/2001 | Barrus | |
| 6,198,696 B1 * | 3/2001 | Korpi et al. | 368/21 |
| 6,282,431 B1 | 8/2001 | Konno | |
| 6,334,030 B1 * | 12/2001 | Mizumo et al. | 396/310 |
| 6,343,360 B1 * | 1/2002 | Feinleib | 713/1 |
| 6,466,517 B1 * | 10/2002 | Kohl | 368/28 |
| 6,487,656 B1 * | 11/2002 | Kim et al. | 713/2 |
| 6,539,493 B1 | 3/2003 | Kohl | |
| 6,560,612 B1 | 5/2003 | Yamada et al. | |
| 6,567,344 B1 * | 5/2003 | Auer | 368/21 |
| 6,647,370 B1 * | 11/2003 | Fu et al. | 705/8 |
| 6,657,854 B2 | 12/2003 | Horii et al. | |
| 6,697,963 B1 * | 2/2004 | Nouri et al. | 714/31 |
| 6,717,978 B1 | 4/2004 | Yang et al. | |
| 6,728,533 B2 * | 4/2004 | Ishii | 455/425 |
| 6,760,725 B1 * | 7/2004 | Johnson | 707/6 |
| 6,791,628 B1 | 9/2004 | Sellers | |
| 6,801,876 B2 * | 10/2004 | Barney et al. | 702/178 |
| 6,819,961 B2 | 11/2004 | Jacobs et al. | |
| 6,823,508 B1 | 11/2004 | Burkhardt et al. | |
| 6,876,600 B2 | 4/2005 | Ito et al. | |
| 6,879,842 B2 | 4/2005 | King et al. | |
| 6,901,557 B1 | 5/2005 | Martinez et al. | |
| 7,030,837 B1 | 4/2006 | Vong et al. | |
| 7,069,055 B1 * | 6/2006 | Lee | 455/566 |
| 7,131,448 B2 | 11/2006 | Lund | |
| 7,188,628 B2 | 3/2007 | Shubert | |
| 7,217,001 B2 | 5/2007 | Vrsalovic | |
| 7,222,249 B2 * | 5/2007 | Morisawa et al. | 713/320 |
| 7,263,775 B2 | 9/2007 | Moulton | |
| 7,296,905 B2 | 11/2007 | Etter et al. | |
| 2002/0061747 A1 * | 5/2002 | Laakkonen | 455/433 |
| 2002/0072875 A1 | 6/2002 | Barney et al. | |
| 2002/0140627 A1 | 10/2002 | Ohki et al. | |
| 2002/0191029 A1 | 12/2002 | Gillespie et al. | |
| 2003/0100323 A1 | 5/2003 | Tajima et al. | |
| 2004/0107339 A1 | 6/2004 | Morisawa et al. | |
| 2004/0107372 A1 | 6/2004 | Morisawa et al. | |
| 2004/0128549 A1 | 7/2004 | Poisner | |
| 2004/0205368 A1 | 10/2004 | Lange-Pearson et al. | |

FOREIGN PATENT DOCUMENTS

| | | |
|---|---|---|
| JP | 9-26832 | 1/1997 |
| JP | 11-119875 | 4/1999 |
| JP | 2000-259281 | 9/2000 |

OTHER PUBLICATIONS

Tim O'Reilly et al., "Windows 95 in a Nutshell", Jun. 1998, O'Reilly & Associates Inc., p. 84.

Illumi-Nail Grinder by Master Grooming Tools. Available at http://www.petedge.com/catalog/product.jsp?productId=46930.

* cited by examiner

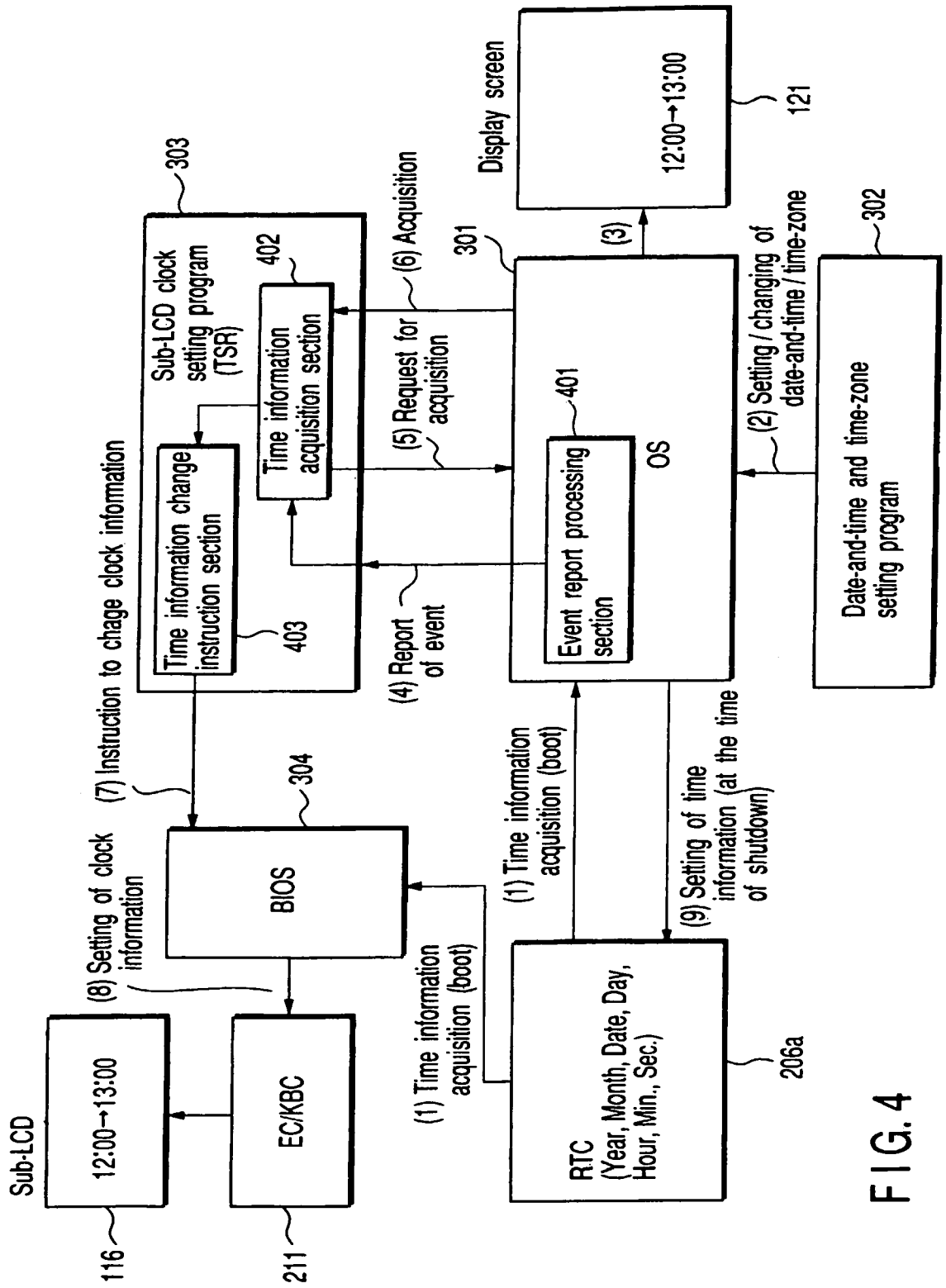
F I G. 4

INFORMATION-PROCESSING APPARATUS AND CLOCK INFORMATION DISPLAY CONTROL METHOD FOR USE IN THE APPARATUS

CROSS-REFERENCE TO RELATED APPLICATIONS

This application is a continuation of application Ser. No. 10/183,507, filed June 28, 2002 now U.S. Pat. No. 7,406,667 that claims the benefit of priority from prior Japanese Patent Application No. 2001-290247, filed Sep. 21, 2001, both of which are incorporated by reference.

BACKGROUND OF THE INVENTION

1. Field of the Invention

The present invention relates to an information-processing apparatus, and a clock information display control method for use in the information-processing apparatus.

2. Description of the Related Art

In general, in an information-processing apparatus such as a personal computer, an operating system manages various system information items. As one of such system information items, system time information such as "time and date" is known. The management of system time information by the operating system facilitates time management of various data items, represented by the management of the date and time of file creation.

Specifically, the operating system manages system time information and the time zone of the computer, thereby displaying, for example, the present time in the form of a clock on the desk top screen of the computer, and managing the date and time of file creation using the system time information. A user can change the date and time of the system time information managed by the operating system when necessary. Further, when the user has designated a time zone, the operating system automatically sets and manages the data and time corresponding to the designated zone.

However, the present time displayed as a clock on the display screen by the operating system cannot be seen before the operating system has booted up. Further, in a laptop type or notebook type personal computer, the display screen cannot be seen even after the system has booted up, if the display is closed, and accordingly the clock on the display screen cannot be seen.

BRIEF SUMMARY OF THE INVENTION

It is an object of the present invention to provide an apparatus and a clock information display control method employed therein, which enables the user to confirm time.

According to an embodiment of the present invention, there is provided an information-processing apparatus capable of controlling a main display and a sub-display, comprising: means for displaying, on the sub-display, clock information indicating of time; means for acquiring changed time information managed by an operating system, when the time information has been changed in accordance with a request for changing of the time information; and means for changing the time of the clock information displayed on the sub-display, based on the acquired changed time information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a block diagram useful in explaining a series of time display control executed from when the computer of the embodiment is activated, to when the computer is shutdown.

DETAILED DESCRIPTION OF THE INVENTION

Figure 1:
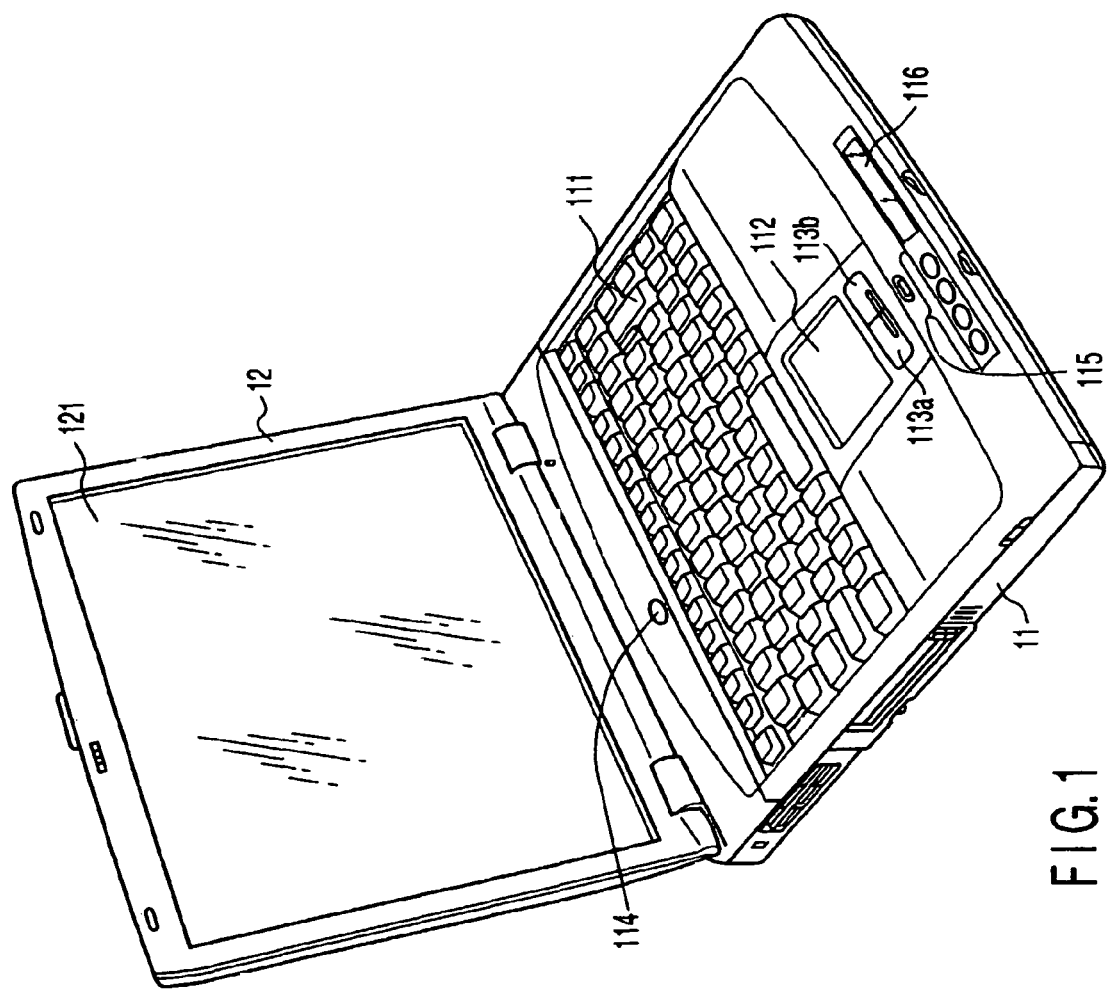
FIG. 1 is a perspective view of a computer according to an embodiment of the invention, illustrating its display-open state.
Figure 2:
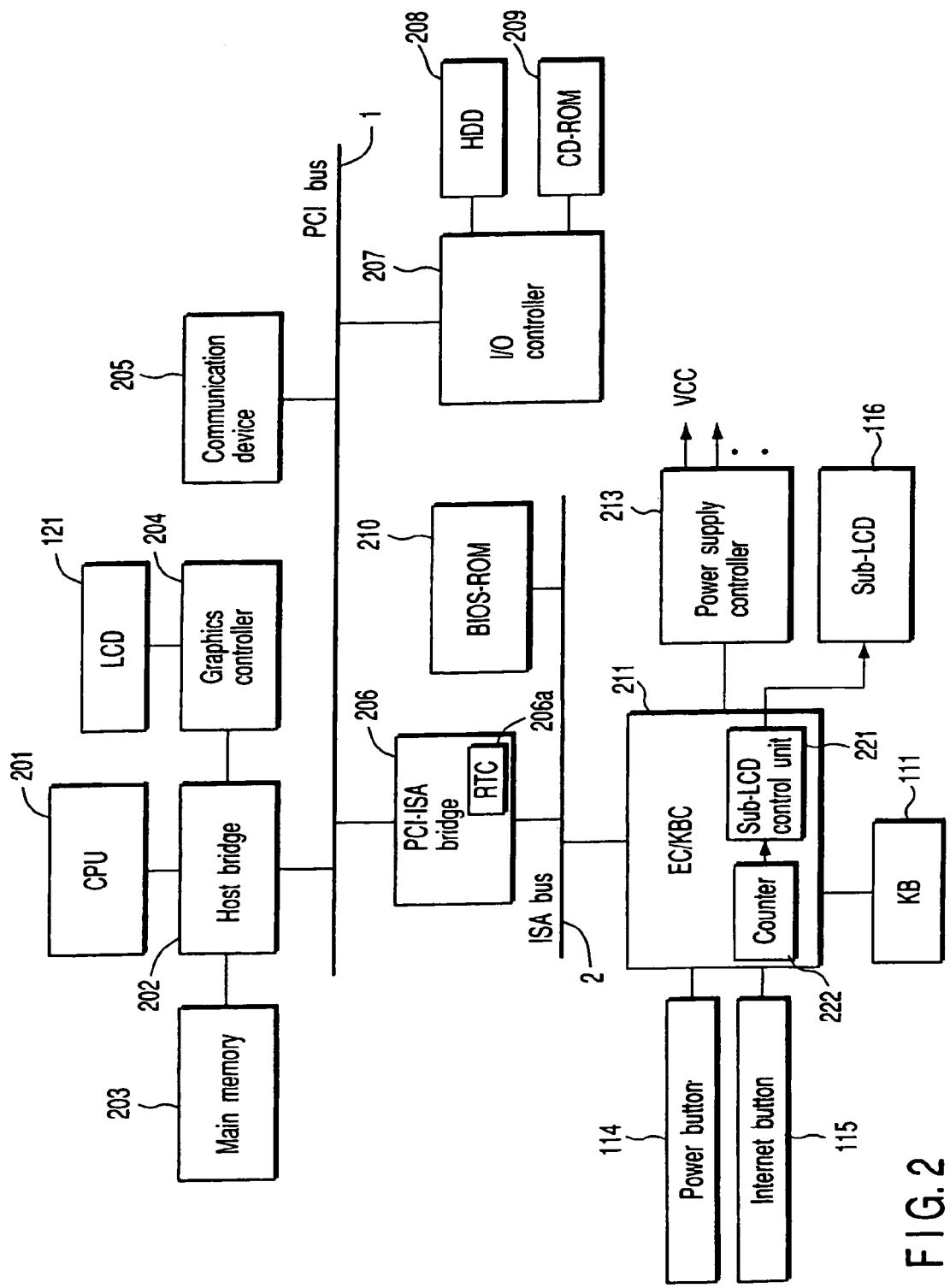
FIG. 2 is a block diagram illustrating the system configuration of the computer of the embodiment.

An embodiment of the invention will be described with reference to the accompanying drawings. Referring first to FIGS. 1 and 2, a description will be given of the configuration of an information-processing apparatus according to the embodiment. In this embodiment, the information-processing apparatus is realized as a notebook-type personal computer.

FIG. 1 is a front view showing a state in which the display unit of the computer is open. The computer comprises a computer main body 11 and display unit 12. The display unit 12 incorporates a LCD (Liquid Crystal Display) panel 121. The LCD panel 121 is used as a main display of the computer. The display unit 12 is attached to the computer main body 11 such that it can move between its open position and closed position. The computer main body 11 is shaped like a thin box, and is provided with a keyboard 111, a pad-type pointing device 112 and right and left buttons 113a and 113b, etc., on the upper surface of the main body 11.

A power button 114 for turning on/off the computer is provided on a rear end portion of the upper surface of the main body 11. Further, a plurality of buttons 115 and a sub LCD 116 are provided on a front end portion of the upper surface of the main body 11.

Each of the buttons 115 is an external input button formed of hardware, and is used, for example, to execute reproduction control of CD audio data or activate a predetermined program. The sub LCD 116 is a sub display unit configured to display various statuses of the computer, such as the status of reproduced audio data, the connection/non-connection status of the external AC power supply, and information as to whether or not the hard disk drive is accessed, etc. Moreover, the sub LCD 116 displays clock information indicative of time.

The depth of the main body 11 is greater than that of the display unit 12. When the display unit 12 is closed, it covers the keyboard 111, pointing device 112 and buttons 113a and 113b, but does not cover the buttons 115 and sub LCD 116, i.e. they are exposed. Accordingly, even if the display unit 12 is closed, the user can operate the buttons 115 or see the sub LCD 116. Thus, the sub LCD 116 is provided at a position on the computer main body 11 such that it is visible whether the display unit 12 is in the closed or open position.

FIG. 2 shows the system configuration of the computer. As shown, the computer comprises a CPU 201, a host bridge 202, a main memory 203, a graphics controller 204, a communication device 205, a PCI-ISA bridge 206, an I/O controller 207, a hard-disk drive (HDD) 208, a CD-ROM drive 209, a BIOS-ROM 210, an embedded-controller/keyboard-controller IC (EC/KBC) 211, and a power supply controller 213, etc.

The CPU 201 is provided for controlling the operation of the computer, and executes an operating system and application/utility programs loaded from the hard disk drive (HDD) 208 to the main memory 203. The CPU 201 also executes a BIOS (Basic Input Output System) stored in the BIOS-ROM 210.

The host bridge 202 is a device for interactively connecting a local bus of the CPU 201 to a PCI bus 1. The graphics controller 204 controls the LCD unit 121 used as the display monitor for the computer. The communication device 205 is a PCI device and is used to connect the computer to a computer network, such as the Internet. The I/O controller 207 is also a PCI device and contains, for example, an IDE controller for controlling the hard disk drive (HDD) 208 and CD-ROM drive 209.

The PCI-ISA bridge 206 is a device that interactively connects the PCI bus 1 to an ISA bus 2. This bridge contains a real-time clock (RTC) 206a and various system devices such as a system timer, a DMA controller and an interruption controller, etc. The real-time clock (RTC) 206a is a clock device configured to measure time, and is used as a clock/calendar circuit. The real-time clock (RTC) 206a manages time information such as year, month, date, day, hour, minutes and seconds, etc. The time information of the real-time clock (RTC) 206a is used as reference data concerning the date and time managed by the operating system. The real-time clock (RTC) 206a is independently powered by a dedicated battery.

The BIOS-ROM 210 stores the BIOS. The BIOS is a program for controlling the hardware components incorporated in the system. The BIOS includes a function routine to read the time information from the real-time clock (RTC) 206a, and a function routine to correct the time of the clock information displayed on the sub LCD 116 by controlling an embedded-controller/keyboard-controller IC (EC/KBC) 211.

The embedded-controller/keyboard-controller IC (EC/KBC) 211 is a one-chip microcomputer in which an embedded controller for power management and a keyboard controller for controlling the keyboard 111 are integrated. The embedded-controller/keyboard-controller IC (EC/KBC) 211 operates in conjunction with the power supply controller 213 to turn on/off the computer in accordance with the operation of the power button 114. Further, in the embodiment, the EC/KBC 211 includes, as a function unit for displaying clock information on the sub LCD 116, a sub LCD control unit 221 configured to control the display of the sub LCD 116, and a counter 222 configured to count up the value of the clock information set by the BIOS, thereby sequentially generating time point values to be displayed on the sub LCD 116.

The embedded-controller/keyboard-controller IC (EC/KBC) 211 and sub LCD 116 are continuously supplied with operation power, and hence the sub LCD 116 can always display the clock information indicative of the present time, even if the computer is in the powered-off state.

Figure 3:
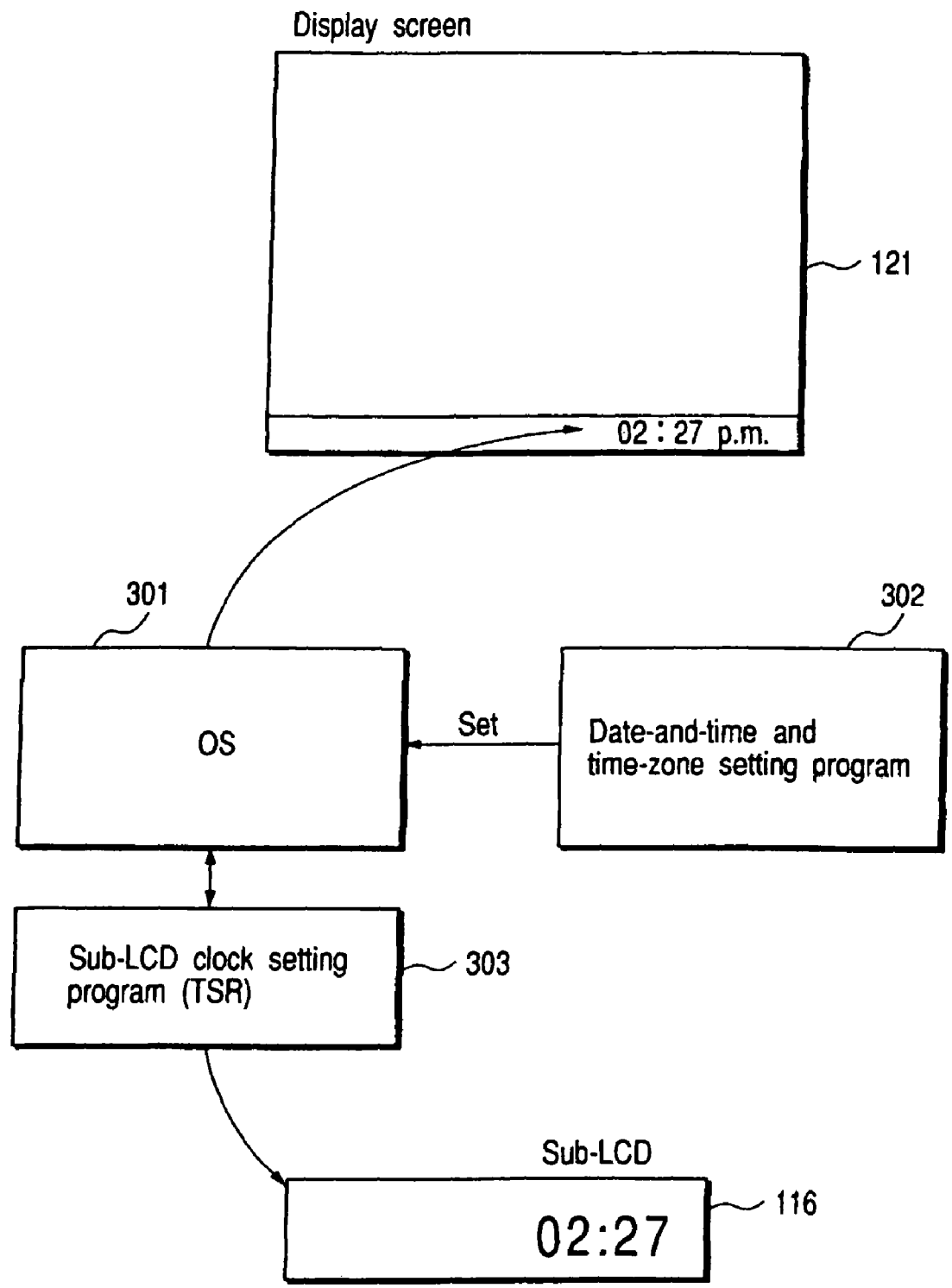
FIG. 3 is a block diagram useful in explaining a mechanism for synchronizing the system time of the computer of the embodiment with a time displayed on a sub LCD.

Referring now to FIG. 3, a description will be given of a mechanism for synchronizing the time displayed on the sub LCD 116 with the time managed by the operating system.

The operating system (OS) denoted by reference numeral 301 operates in conjunction with the real-time clock (RTC) 206a to manage the date and time as system time information, and can display the present time on the desktop screen of the LCD panel 121, as shown in FIG. 3. The desktop screen is an on-screen work area provided by the operating system (OS) 301. Further, the operating system (OS) 301 has a function for managing the date and time corresponding to each time zone. Using a date-and-time/time-zone setting program 302, the user can change, when necessary, the date and time of the system time information managed by the operating system (OS) 301. Further, when the user has designated a time zone, the operating system (OS) 301 automatically acquires and manages the date and time of the system time information corresponding to the designated zone.

When the date-and-time/time-zone setting program 302 has instructed the operating system (OS) 301 to change the time or zone, the operating system (OS) 301 promptly changes the system time information of the system. Accordingly, the present time displayed on the display screen of the LCD panel 121 is also promptly changed.

When the operating system (OS) 301 has changed the system time information, a sub-LCD clock setting program 303 detects it. The sub-LCD clock setting program 303 is realized as a terminate-and-stay-resident program (TSR). This program can receive an event indicative of the change of system time information from the operating system (OS) 301, by, for example, presetting that the operating system informs the program 303 of the event when it has occurred. Naturally, to detect a change in time information, the sub-LCD clock setting program 303 may employ a hook mechanism. When an instruction to change the time information is issued from the date-and-time/time-zone setting-program 302 to the operating system (OS) 301, the instruction is hooked, thereby reporting an event indicative of the change of the system time information to the sub-LCD clock setting program 303.

Upon receiving updated system time information from the operating system (OS) 301, the sub-LCD clock setting program 303 sets the present system time indicated by the received system time information, in the embedded-controller/keyboard-controller IC (EC/KBC) 211 via the BIOS. Thus, the present time included in the clock information displayed on the sub LCD 116 is changed and corrected in accordance with the updated system time.

Referring then to FIG. 4, a description will be given of a series of clock display control executed from when the computer is activated, to when it is shutdown.

Step 1: Acquisition of Time Information

When the power button 114 has been pushed, the computer is powered on, thereby booting-up the computer. In the boot-up process, a BIOS 304 acquires time information from the real-time clock (RTC) 206a, and sets the present time that is indicated by the time information in the counter 222 of the embedded-controller/keyboard-controller IC (EC/KBC) 211. If the present time displayed on the sub LCD 116 differs from that indicated by the time information acquired from the real-time clock (RTC) 206a, the present time on the sub LCD 116 is corrected.

The OS 301 also acquires the time information of the real-time clock (RTC) 206a, and displays, on the display screen of the LCD panel 121, the present time indicated by this time information.

Step 2: Setting/Changing of Date-and-Time/Time-Zone

The user activates the date-and-time/time-zone setting program 302 to change the present time or zone information. The updated present time or zone information specified by the change operation is supplied from the date-and-time/time-zone setting program 302 to the OS 301.

Step 3: Change of System Time

The OS 301 changes the system time information it manages, on the basis of the information supplied from the date-and-time/time-zone setting program 302. As a result, the present time on the display screen of the LCD panel 121 is changed, for example, from "12:00" to "13:00".

Step 4: Report of Event Indicative of Change of System-Time Information

After changing the system time information, the OS 301 issues an event indicative of the change of the system time information to the sub-LCD clock setting program 303 via an event report processing section 401. From this event, the sub-LCD clock setting program 303 detects the change of the system time information.

Steps 5 and 6: Request for and Acquisition of System Time Information

Upon receiving the event indicative of the change of the system time information, the sub-LCD clock setting program 303 causes a time information acquisition section 402 to issue, to the OS 301, a request for the acquisition of the system time information. As a result, the sub-LCD clock setting program 303 acquires the updated system time information from the OS 301.

Step 7: Instruction to Change Clock Information

The sub-LCD clock setting program 303 reports the present time, indicated by the updated system time information, to the BIOS 304 via a time information change instruction section 403, thereby instructing the BIOS 304 to change the present time displayed on the sub LCD 116.

Step 8: Changing of Time of the Clock Information

The BIOS 304 sets the present time, indicated by the updated system time information, in the counter 222 of the embedded-controller/keyboard-controller IC (EC/KBC) 211, thereby synchronizing the present time displayed on the sub LCD 116 with the system time indicated by the system time information. As a result, the present time on the sub LCD 116 is changed, for example, from "12:00" to "13:00".

Step 9: Setting of System Time Information

Upon receiving a request for the shutdown of the OS 301 issued by the user, the OS 301 sets the present system time in the real-time clock (RTC) 206a during the shutdown process. When the system is next powered on, the time information read from the real-time clock (RTC) 206a is set in EC/KBC 211 and displayed on the sub LCD 116.

As described above, by virtue of the mechanism for acquiring updated system time information from the OS 301 each time the information is updated, the time displayed on the sub LCD 116 can be made to coincide with the system time. Since the time information of the real-time clock (RTC) 206a is read only when the system is powered on, the time displayed on the sub LCD 116 can be made to coincide with the system time without adversely affecting the system performance.

Figure 5:
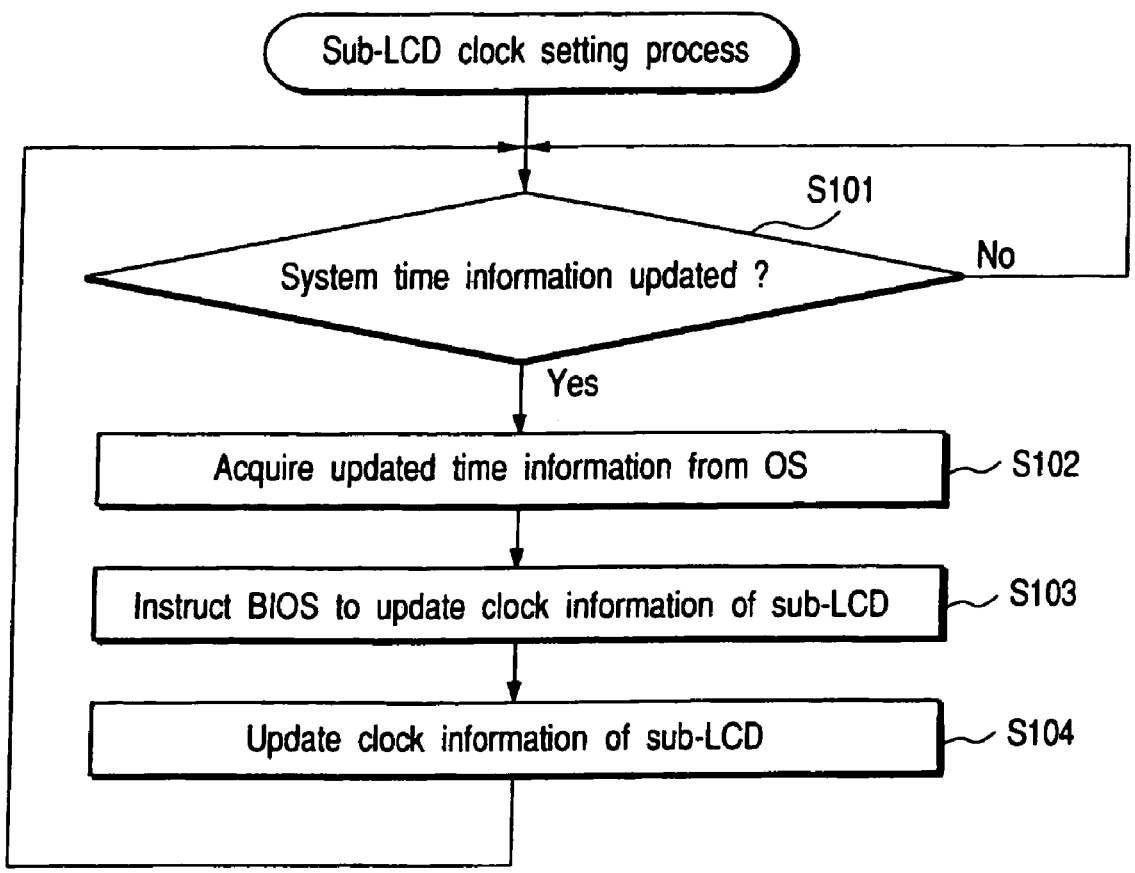
FIG. 5 is a flowchart illustrating a time setting process executed in the sub LCD of the computer.

Referring to the flowchart of FIG. 5, a description will now be given of the time setting process executed for the sub LCD 116 by the sub-LCD clock setting program 303.

Firstly, the sub-LCD clock setting program 303 determines whether or not the system time information has been updated, by the presence of an event from the OS 310 (step S101). It there is an event from the OS 301, the sub-LCD clock setting program 303 determines that the system time information has been updated (YES of the step S101), thereby issuing a request for the acquisition of the updated system time information to the OS 301, and acquiring the updated system time information (step S102).

Subsequently, the sub-LCD clock setting program 303 instructs the BIOS 304 to change the time included in the clock information of the sub LCD 116 (step S103). This change instruction data contains the present time indicated by the updated system time information acquired from the OS 301. The BIOS 304 sets this present time in the counter 222 of the embedded-controller/keyboard-controller IC (EC/KBC) 211, thereby changing the time of the clock information displayed on the sub LCD 116 (step S104). Instead of the BIOS 304, the sub-LCD clock setting program 303 itself may set the present time in the counter 222 of the embedded-controller/keyboard-controller IC (EC/KBC) 211.

As described above, the embodiment employs the sub LCD 116, as well as the LCD panel 121 used as the main display, and displays clock information on the sub LCD 116. Since, in particular, the sub LCD 116 is provided at a position not hidden under LCD panel 121, it can always display the clock information to the user, irrespective of whether the OS 301 is activated or the LCD panel 121 is open or closed. Further, since a mechanism for making the clock information displayed on the sub LCD 116 reflect a change result obtained when the user has changed the system time information managed by the OS 301 is provided, the time displayed on the sub LCD 116 can be always made to coincide with the system time.

Although in the above-described embodiment, only the present time is displayed on the sub LCD 116, date information such as year, and date may be displayed thereon as well as the present time. Furthermore, the date and time included in the clock information on the sub LCD 116 can be synchronized with the date and time of the system time information.

Moreover, since the clock control functions of the embodiment are all realized by a computer program, the same advantage as the above can be achieved simply by storing each computer program in a computer-readable recording medium, and inserting the medium into a computer having a function for displaying clock information in its sub display device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
a main body;
a main display attached to the main body, the main display being movable between an open position and a closed position;
a power supply controller configured to supply operation power;
a sub-display provided on a surface portion of the main body, the sub-display having a display surface exposed irrespective of whether the main display is set to the open position or the closed position, the sub-display being configured to be supplied with operation power from the power supply controller irrespective of whether the apparatus is set in a powered-on state or a powered-off state;
a clock device provided in the main body, that measures time and is configured to be supplied with operation power from a dedicated battery irrespective of whether the apparatus is set to the powered on state or the powered off state;

a controller provided in the main body, configured to display, on the sub-display, clock information indicative of time, the controller including a counter which counts up a present time set therein to generate values of the time displayed on the sub-display, the counter being configured to be supplied with operation power from the power supply controller irrespective of whether the apparatus is set in the powered-on state or the powered-off state;

means for sending, to an operating system which is executed by a central processing unit within the main body, a request for changing of the present time or time zone, in accordance with a user's operation;

means for detecting, by using a resident program which is executed by the central processing unit, that the operating system changes system time in accordance with the request for changing of the present time or the time zone, and for acquiring changed system time from the operating system when the change of the system time is detected, the system time being managed by the operating system and being displayed on the main display; and means for performing, by using a BIOS program which is executed by the central processing unit, a process for setting, in the counter, the changed system time which is acquired by the resident program, thereby changing the present time displayed on the sub-display to synchronize the present time displayed on the sub-display with the changed system time being displayed on the main display.

2. The apparatus according to claim 1, further comprising:

means for performing, by using the BIOS program, a process for acquiring a present time from the clock device and a process for setting, in the counter, the acquired present time, when the apparatus is powered on.

3. The apparatus according to claim 1, wherein the resident program is a terminate-and-stay-resident program.

4. The apparatus according to claim 1, wherein the detecting means includes means for instructing the BIOS program to change the present time displayed on the sub-display.

5. A method of controlling display of clock information of apparatus, the apparatus including a main body, a main display attached to the main body, a sub-display provided on a surface portion of the main body, the main display being movable between an open position and a closed position, the sub-display having a display surface exposed irrespective of whether the main display is set to the open position or the closed position, the apparatus further including a power supply controller to supply operation power, a clock device provided in the main body, and a controller provided in the main body, configured to display, on the sub-display, clock information indicative of time, the controller including a counter which counts up a present time set therein to generate values of the time displayed on the sub-display, the method comprising:

supplying, by the power supply controller, operation power to the sub-display irrespective of whether the apparatus is set in a powered-on state or a powered-off state;

supplying, by the power supply controller, operation power to the counter irrespective of whether the apparatus is set in the powered-on state or the powered-off state;

sending, to an operating system which is executed by a central processing unit within the main body, a request for changing of the present time or time zone, in accordance with a user's operation;

detecting, by using a resident program which is executed by the central processing unit, that the operating system changes system time in accordance with the request for changing of the present time or the time zone, and for acquiring changed system time from the operating system when the change of the system time is detected, the system time being managed by the operating system and being displayed on the main display; and performing, by using a BIOS program which is executed by the central processing unit, a process for setting, in the counter, the changed system time which is acquired by the resident program, thereby changing the present time displayed on the sub-display to synchronize the present time displayed on the sub-display with the changed system time being displayed on the main display.

6. The method according to claim 5, further comprising:

performing, by using the BIOS program, a process for acquiring a present time from the clock device and a process for setting, in the counter, the acquired present time, when the apparatus is powered on.

* * * * *